United States Patent [19]
Oranje

[11] 3,988,132
[45] Oct. 26, 1976

[54] DEVICE FOR SEPARATING IMPURITIES FROM GASES

[75] Inventor: Leendert Oranje, Haren, Netherlands

[73] Assignee: Stamicarbon B.V., Geleen, Netherlands

[22] Filed: Feb. 20, 1975

[21] Appl. No.: 551,293

[30] Foreign Application Priority Data

Mar. 19, 1974 Netherlands............... 7403639

[52] U.S. Cl.................................. 55/399; 55/457; 55/459 C
[51] Int. Cl.$^2$......................................... B01D 45/12
[58] Field of Search....... 55/391, 392, 394, 396–399, 55/424–426, 449, 456, 457, 458, 459 C

[56] References Cited
UNITED STATES PATENTS

| | | | |
|---|---|---|---|
| 1,066,704 | 7/1913 | Brassert ................... | 55/391 |
| 1,573,135 | 2/1926 | Bourne et al. ............ | 55/457 X |
| 2,582,423 | 1/1952 | Foley ........................ | 55/449 X |
| 2,849,079 | 8/1958 | Evans........................ | 55/392 |
| 2,918,139 | 12/1959 | Silverman ................ | 55/449 X |
| 3,822,533 | 7/1974 | Oranje ..................... | 55/394 |

Primary Examiner—Frank W. Lutter
Assistant Examiner—David L. Lacey
Attorney, Agent, or Firm—Cushman, Darby & Cushman

[57] ABSTRACT

This invention relates to a device for separating particles from a gas stream which consists essentially of a cylindrical vessel having a feed pipe connected thereto and intersecting the axis of said vessel; an axial discharge pipe connected to and protruding into said vessel, a sleeve located with some clearance around said discharge pipe and having fixed thereto a plurality of helicoidal first impeller blades so as to cause the gas feed to rotate; means located within said vessel and below said blades to discharge said particles; said device being further characterized by a plurality of spiral second impeller blades extending perpendicularly below and above, and being fixed to, said helicoidal first impeller blades, such that one vertical edge of each of said spiral blades touches said sleeve along, essentially, a straight vertical line, that the other, essentially straight, vertical edge of each spiral blade is located at a distance from the surface of said sleeve which is between 0.33 and 0.90 of the distance between said sleeve and the inner wall of said vessel and that said spiral blades extend to beyond the lower edges of said helicoidal blades.

1 Claim, 4 Drawing Figures

DEVICE FOR SEPARATING IMPURITIES FROM GASES

The invention relates to a device for separating liquids and/or solids from a gas stream which device principally consists of a cylindrical vessel a feed pipe intersecting the axis of the vessel an axial discharge pipe around which with some clearance a sleeve is installed with impeller blades to cause the gas feed to rotate and below which means are present to collect and discharge the liquid and/or solid particles separated off.

A separator of this kind is described i.a. in U.S. Pat. No. 3,822,533. The separator is applied in particular for purification of gases subject to a high pressure, for instance of more than 50 Bars. Said separator brings the drawback that a liquid film may form around the sleeve to which the impeller blades are fixed. This film has too small a rotation speed to be separated from the gas stream. When the liquid has reached the bottom of the sleeve it is partly aspirated into the discharge pipe in spite of the clearance between said sleeve and the discharge pipe.

The purpose of the invention is to avoid the above-mentioned drawback and to increase the separating capacity. According to the invention this is achieved by installing guide vanes below and above the impeller blades and about perpendicularly thereto, which touch the sleeve by one end and, in the shape of an impeller, extend from the sleeve to a point beyond the end of the impeller blades, while the other end of the vanes is located at a point between 0.33 and 0.90 of the distance between the sleeve and the inner wall of the vessel.

With the guide vanes according to the invention the capacity for separating off liquids is increased. It has further proved that also solids, even in the absence of liquid, can be separated off in a better way. It is moreover surprising that the design according to the invention does not cause a change to occur in the presence drop of the streaming gas in the vessel. The point where the guide vanes touch the sleeve is not critical; this point may, without any objection, be located about halfway between the upper edges of adjacent impeller blades.

BRIEF DESCRIPTION OF THE DRAWINGS

The invention will be elucidated with the aid of a drawing, in which: forms

The gas to be purified is supplied to the cylindrical part of the separator 1 via a pipe nozzle 2. The gas first streams along a guide plate 3 and is subsequently made to rotate by four impeller blades 4. The liquid and/or solid separated off along the wall of the vessel 1 accumulate(s) in the bottom part of the separator and is(are) made to settle by means of the plates 10, 12 and 13. The material separated off is discharged through line 5 and valve 6. The purified gas is discharged via discharge pipe 7. For a clear view, FIG. 1 shows only one of the four impeller blades 4 which are fixed to the sleeve 9, which sleeve is installed around the discharge pipe 7 with some clearance. The impeller blades have been arranged with some clearance between them and overlap each other. This is shown more clearly in the perspective view of FIG. 2. The guide vanes 14 according to the invention are installed below and above the impeller blades 4 and are arranged about perpendicularly thereto. In the places 15, they are fixed by one end to the sleeve 9, at about halfway between the impeller upper edges of adjacent blade 4, and they extend just beyond the end 17 of this blade by the end 16. According to FIG. 3 the end 16 is located at about the middle of the distance between the sleeve 9 and the inner wall of the vessel 1. The number of impeller blades 4 need not be limited to four, as indicated in the FIGS. 2 and 3. The embodiment of the drawing, further, does not imply a limitation of the invention.

Figure 1:
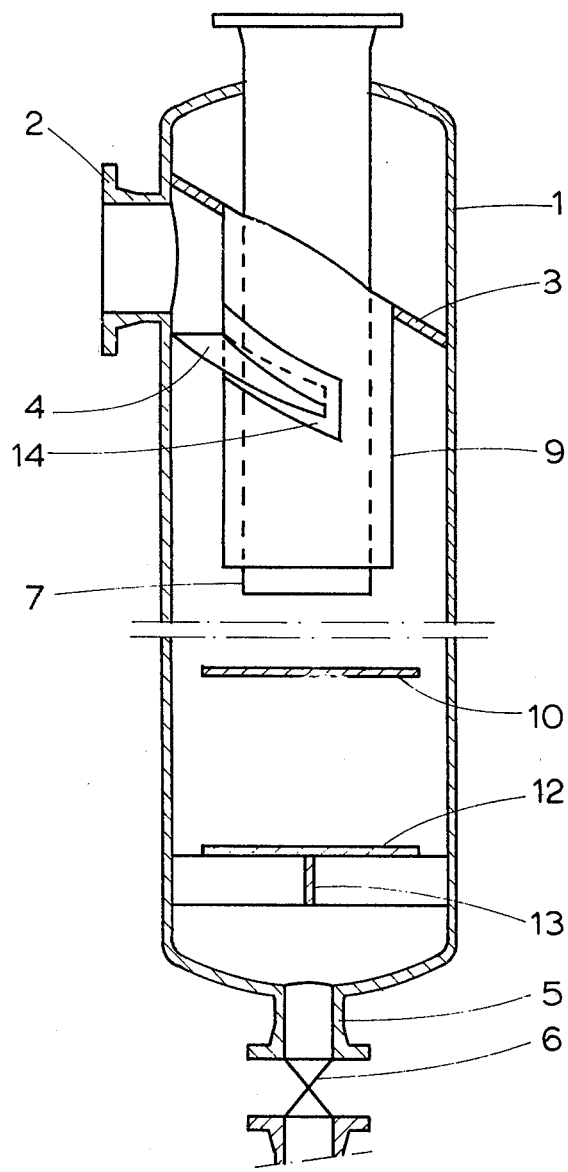
FIG. 1: a cut-away, vertical view of the inside of a separator according to the invention.
Figure 2:
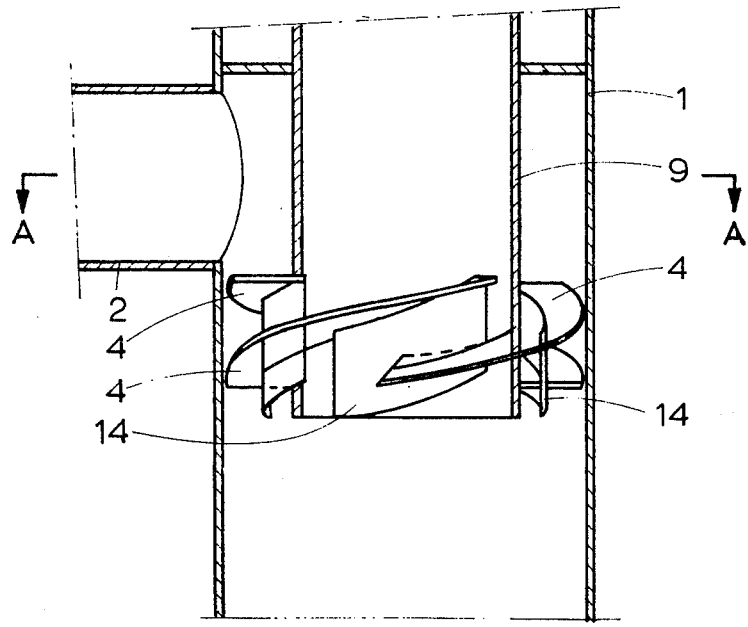
FIG. 2: is a perspective representation of the impeller blades with guide vanes.
Figure 3:
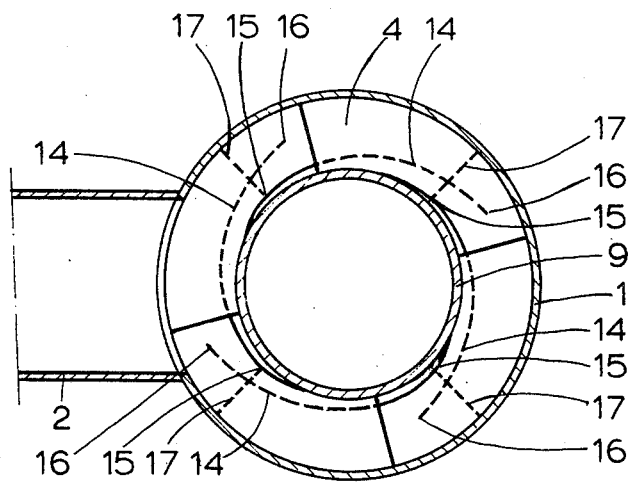
FIG. 3: gives a top view of the section A-A of FIG. 2.
Figure 4:
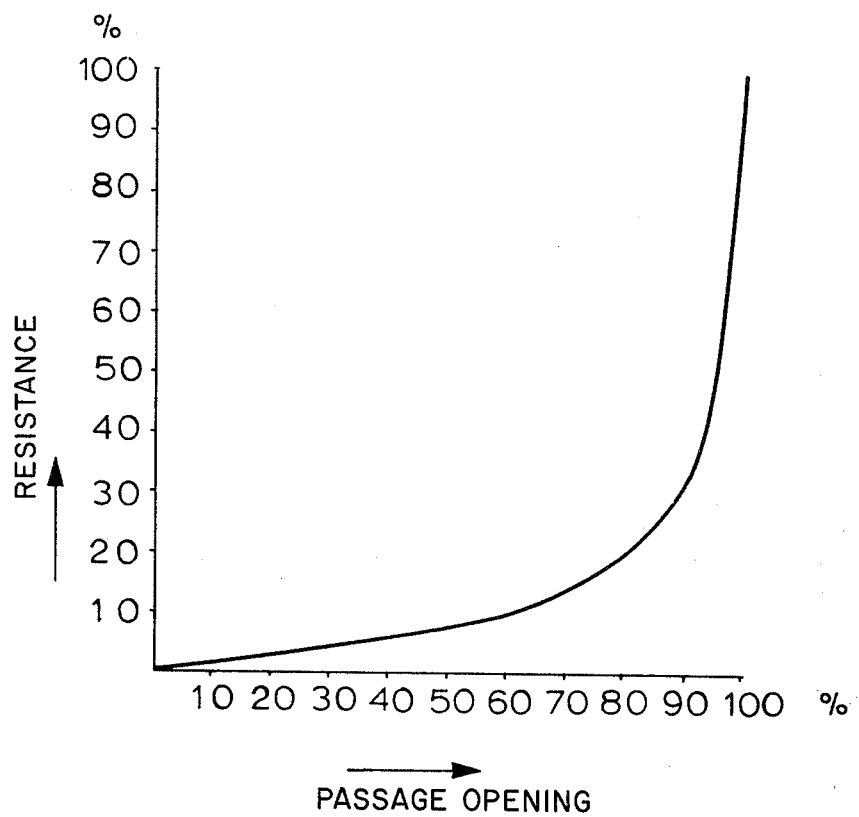
FIG. 4: is a graph showing the resistance as a function of the passage hole.

In the graph according to FIG. 4 the resistance is given in per cent on the vertical axis and the opening between the guide vanes 14 and the inner wall of the vessel 1 in per cent of the possible opening on the horizontal axis. The graph shows that if the opening is closed to 85–90% the resistance of the separator increases rapidly.

The invention will also be elucidated with the rsults of a number of tests, in which, in a separator according to the drawing, the collecting-efficiencies without and with the guide vanes according to the invention was determined for liquid (table A) and for solid, corresponding with the dust in natural gas lines. (Tables B and C).

Table A

| amount of gas through separator in $m_o^3/h$ | liquid-collection efficiency in % by weight | |
|---|---|---|
| | without vanes | with vanes (opening left 50 %) |
| 300 | 90 | 98.5 |
| 480 | 94.7 | 99.6 |
| 610 | 95.4 | 99.5 |

Table B

| amount of gas through separator in $m_o^3/h$ | dust-collection efficiency in % by weight | |
|---|---|---|
| | without vanes | with vanes (opening left 66 %) |
| 250 | 95.2 | 98.1 |
| 570 | 96.5 | 98.2 |

Table C

| amount of gas through separator in $m_o^3/h$ | dust-collection efficiency in % by weight | |
|---|---|---|
| | without vanes | with vanes (opening left 80 %) |
| 250 | 95.2 | 99.1 |
| 570 | 96.5 | 99.8 |

What is claimed is:

1. Device for separating particles from a gas stream which consists essentially of a cylindrical vessel having a feed pipe connected thereto; an axial discharge pipe connected to and protruding into said vessel, a sleeve located in said vessel around said discharge pipe and spaced therefrom and having fixed thereto helicoidal impeller blade means for causing the gas feed to rotate; a guide plate extending between said sleeve and the inner surface of said vessel and positioned adjacent said feed pipe so as to guide the feed toward said helicoidal blade means; means located within said vessel and below said blade means to discharge said particles; said device further having a plurality of spiral impeller blades extending perpendicularly below and above, and being fixed to, aid helicoidal impeller blade means, such that one vertical edge of each of said spiral blades touches said sleeve along, essentially, a straight vertical line, the other, essentially straight, vertical edge of each spiral blade being located at a distance from the surface of said sleeve which is between 0.33 and 0.90 of the distance between said sleeve and the inner wall of said vessel and that said spiral blades extend to beyond the lower edges of said helicoidal blade means.

* * * * *

UNITED STATES PATENT OFFICE
CERTIFICATE OF CORRECTION

Patent No. 3,988,132    Dated October 26, 1976

Inventor(s) Leendert Oranje

It is certified that error appears in the above-identified patent and that said Letters Patent are hereby corrected as shown below:

On the cover sheet the Assignee should read

-- N. V. Nederlandse Gasunie, Groningen, Netherlands --.

Signed and Sealed this

Twenty-second Day of February 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,988,132          Dated October 26, 1976

Inventor(s) Leendert Oranje

It is certified that error appears in the above-identified patent and that said Letters Patent are hereby corrected as shown below:

Column 1, line 40, "presence" should read --pressure--.

Column 3, line 9, "aid" should read --said--.

Signed and Sealed this

Third Day of May 1977

[SEAL]

Attest:

RUTH C. MASON
*Attesting Officer*

C. MARSHALL DANN
*Commissioner of Patents and Trademarks*